(12) United States Patent
Reuter et al.

(10) Patent No.: US 12,519,358 B2
(45) Date of Patent: Jan. 6, 2026

(54) COIL ELEMENT FOR AN ELECTRICAL MACHINE

(71) Applicant: ZF FRIEDRICHSHAFEN AG, Friedrichshafen (DE)

(72) Inventors: Stefan Reuter, Hammelburg (DE); Ralf Wittstadt, Grettstadt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 582 days.

(21) Appl. No.: 17/765,545

(22) PCT Filed: Sep. 25, 2020

(86) PCT No.: PCT/EP2020/076872
§ 371 (c)(1),
(2) Date: Mar. 31, 2022

(87) PCT Pub. No.: WO2021/063822
PCT Pub. Date: Apr. 8, 2021

(65) Prior Publication Data
US 2022/0368186 A1      Nov. 17, 2022

(30) Foreign Application Priority Data

Oct. 1, 2019   (DE) .................... 10 2019 215 097.7

(51) Int. Cl.
*H02K 3/12*      (2006.01)
*H02K 3/28*      (2006.01)
*H02K 15/043*    (2025.01)

(52) U.S. Cl.
CPC ................ *H02K 3/12* (2013.01); *H02K 3/28* (2013.01); *H02K 15/0433* (2025.01); *H02K 2213/03* (2013.01)

(58) Field of Classification Search
CPC ......... H02K 3/12; H02K 3/28; H02K 15/0478
See application file for complete search history.

(56) References Cited

U.S. PATENT DOCUMENTS 2,408,219 A * 9/1946 Liwschitz ................ H02K 3/28
                                                    310/202
5,097,167 A * 3/1992 Kanayama ............... H02K 3/26
                                                    310/201

(Continued)

FOREIGN PATENT DOCUMENTS

DE         10239730        3/2004
DE       102012012120      3/2013

(Continued)

OTHER PUBLICATIONS

Office Action of corresponding German Patent Application No. 10 2019 215 097.7.

(Continued)

*Primary Examiner* — Jeffrey T Carley
*Assistant Examiner* — Jose K Abraham
(74) *Attorney, Agent, or Firm* — COZEN O'CONNOR

(57) ABSTRACT

A coil element for a coil of an electric machine having at least two conductor elements extending parallel for arrangement in slots of a coil body and at least one connection portion that connects the two conductor elements to one another. The conductor elements and the connection portion are integrally formed. A bending position in a plane defined by the two conductor elements is provided only at a transition from a conductor element to the connection portion, and the connection portion extends in a straight line.

13 Claims, 4 Drawing Sheets

(56) References Cited

U.S. PATENT DOCUMENTS

| | | | | |
|---|---|---|---|---|
| 5,955,810 A * | 9/1999 | Umeda | .................... | H02K 3/44 310/260 |
| 6,727,625 B2 * | 4/2004 | Ooiwa | ............... | H02K 15/0478 310/198 |
| 6,882,077 B2 * | 4/2005 | Neet | ................. | H02K 15/0478 310/201 |
| 7,075,206 B1 * | 7/2006 | Chen | ....................... | H02K 3/28 310/179 |
| 7,098,566 B2 * | 8/2006 | Rajasingham | ........... | H02K 7/12 310/268 |
| 8,174,160 B2 * | 5/2012 | Stiesdal | ................... | H02K 3/12 310/260 |
| 8,667,666 B2 * | 3/2014 | Sadiku | ............... | H02K 15/0478 29/598 |
| 11,843,295 B2 * | 12/2023 | Wang | ....................... | H02K 1/16 |
| 2002/0063490 A1 * | 5/2002 | Asao | ........................ | H02K 3/28 310/207 |
| 2002/0125773 A1 * | 9/2002 | Lim | ...................... | H02K 41/02 310/12.21 |
| 2004/0119362 A1 | 6/2004 | Neet | | |
| 2009/0261683 A1 * | 10/2009 | Sadiku | .................... | H02K 3/12 310/207 |
| 2010/0077599 A1 * | 4/2010 | Tokizawa | .......... | H02K 15/0433 29/596 |
| 2016/0006328 A1 | 1/2016 | Wang et al. | | |
| 2016/0248290 A1 * | 8/2016 | Tamura | .................... | H02K 3/12 |
| 2017/0004900 A1 * | 1/2017 | Ishii | ..................... | H02K 15/105 |
| 2017/0054339 A1 * | 2/2017 | Harakawa | ............... | H02K 3/28 |
| 2018/0034334 A1 * | 2/2018 | Neet | ....................... | H02K 3/28 |
| 2019/0356188 A1 * | 11/2019 | Miyawaki | ............... | H02K 1/16 |

FOREIGN PATENT DOCUMENTS

| | | | |
|---|---|---|---|
| DE | 102015004576 | | 12/2015 |
| DE | 102014223202 | | 5/2016 |
| DE | 102017119033 | | 2/2019 |
| DE | 102017218202 | | 4/2019 |
| DE | 102018203469 | | 9/2019 |
| DE | 102018203471 | | 9/2019 |
| EP | 2124317 | | 11/2009 |
| EP | 2963787 | | 1/2016 |
| JP | 2010142019 A | * | 6/2010 |
| WO | WO 2007146252 | | 12/2007 |

OTHER PUBLICATIONS

Wessel, R. "Die neue Schule des Elektromaschinenbauers" 4. Aufl. Munchen : Richard Pflaum Verlag, 1976. Seiten 189-191.—ISBN 3-7905-0248-0.

* cited by examiner

COIL ELEMENT FOR AN ELECTRICAL MACHINE

This is a U.S. national stage of Application No. PCT/EP2020/076872 filed Sep. 25, 2020. Priority is claimed on German Application No. DE 10 2019 215 097.7 filed Oct. 1, 2019 the content of which is incorporated herein by reference.

BACKGROUND OF THE INVENTION

1. Field of the Invention

The present disclosure is directed to a coil element for an electric machine with a distributed winding and an electric machine with a corresponding winding.

2. Description of Related Art

It is known from the prior art, for example, from DE 10 2014 223 202 A1, that distributed windings with a plurality of strands of conductors distributed along the circumference are provided in an electric machine. A further example of the prior art is shown in WO 2007/146252.

SUMMARY OF THE INVENTION

It is the object of one aspect of the present invention to provide a coil element which minimizes the required installation space as far as possible, particularly in axial direction. A further aspect of the invention is a winding arrangement which is simple and fast to produce and enables an operation of the electric machine with high output and low losses.

According to one aspect of the invention, a coil element for a coil of an electric machine comprises at least two conductor elements extending parallel for arrangement in slots of a coil body and at least one connection portion that connects the two conductor elements to one another, the conductor elements and the connection portion being integrally formed. The coil element is characterized in that a bending position in a plane defined by the two conductor elements is provided only at a transition from a conductor element to the connection portion, and in that the connection portion extends in a straight line.

Coil strands that are formed of one or more coil elements from a piece of an electrically conductive material, for example, copper wire, particularly with rectangular cross section, are utilized for coils in an electric machine, particularly with a distributed winding. In this regard, coil elements are commonly so-called hairpins which, in their initial shape, comprise two conductor elements extending parallel and a turn region connecting the conductor elements. Alternatively, wavelike coil elements having a plurality of conductor elements extending parallel are also possible, two conductor elements in each case being connected to one another via a turn region. Further, the terms "hairpin", "wavelike conductor" or "wave conductor" also comprehend coil elements within the meaning of the present application. The conductor elements are inserted in layers in slots of a coil body which are distributed along the circumference and run in axial direction to form the winding.

The turn region comprises in each instance a transition adjoining the conductor elements in which the conductive material is bent in direction of the other respective conductor element through a bending position. The transitions are integrally connected by a connection portion that runs in a straight line viewed in radial direction. As a result of the straight-line shape, the required axial installation space for the coil head can be reduced and, accordingly, a compact construction can be achieved.

Embodiment forms of a coil element are characterized in that the bending position in the transition is divided into two partial bending positions connected by a straight intermediate portion. In order to reduce the bending angle for each bending position and, therefore, also the stress on an insulating coating which may possibly be provided on the conductive material, or to lower the risk of damage to the latter, the bending position is divided into a plurality of partial bending positions. The partial bending positions are advantageously connected by straight intermediate portions in order to keep the area of the insulating coating loaded by the bending at a distance.

Coil elements according to aspects of the invention are characterized in that two further bending positions in a plane extending perpendicular to the plane defined by the conductor elements are comprised at the connection portion, and in that the further bending positions are bent in opposite directions. The conductor elements are arranged in different layers in case of hairpins or so as to alternate in different layers of the slots in case of wave conductors. An S-shaped configuration with two opposed bending positions is provided in the connection portion so that the turn regions, viewed in axial direction, can be guided past one another along the circumference of the coil head. Because of the S-shaped configuration, the connection regions can be arranged better in radial direction adjacent to one another so as to save axial installation space.

Further embodiment forms of the coil elements are characterized in that the two further bending positions divide the connection portion into a plurality of regions, and two of the regions extend parallel. Viewed in axial direction, the further bending positions can be provided with a relatively large radius and can pass directly into one another. The further bending positions advantageously divide the connection portion into two regions which extend in a straight line viewed in axial direction and which run parallel to one another.

A further straight region can possibly be provided between the further bending positions.

Coil elements according to one aspect of the invention are characterized in that the connection portion or at least a region of the connection portion bounded by bending positions extends arcuately in a plane extending perpendicular to the conductor elements. Alternatively or in addition to an S-shaped configuration with further bending positions, is also possible that the connection portion or regions of the connection portion extend arcuately in a plane extending perpendicular to the conductor elements, i.e., a radial plane. The arrangement of the turn regions can also be improved in radial direction in this way, and axial installation space can accordingly be saved.

Embodiment forms of coil elements are characterized in that the connection portion lies in a plane extending perpendicular to the conductor elements. The required installation space in axial direction can likewise be minimized in that the connection portion is arranged parallel to the axial end of the coil body.

A further aspect of the invention is a wave winding for an electric machine with at least one coil element according to the description. The above-described advantages can be used in this way for the wave winding. The wave winding can comprise a plurality of coil strands, each of which in turn comprises a plurality of coil elements such as hairpins which are electrically conductively connected to one another, or can comprise one or more wave conductors.

Embodiment forms of a wave winding are characterized in that at least two different coil elements are provided which protrude to different extents over the coil body in axial direction with their connection portions, and in that at least the coil elements protruding farther over the coil body are at least partially formed as coil elements according to the description. In particular, when turn regions protrude axially farther over the coil body, a reduction in the required axial installation space can be achieved by the coil elements according to one aspect of the invention.

Wave windings aspects of the invention are characterized in that a plurality of phases and a number of holes q of at least three are provided, in that the wave winding has a standard winding step WS of WS=q*m, where q corresponds to the number of holes and m corresponds to the quantity of phases, in that at least a quantity of coil strands corresponding to the number of holes q is provided connected in parallel, the coil strands comprising in each instance at least one coil element with at least one turn region W, the turn region W comprising the connection portion and the adjacent transitions, in that two different variants of coil elements are provided, in that, in a first variant of the coil elements, the turn region W has a shortened winding step WK between the conductor elements, in that, in a second variant of the coil elements, the turn region W has a lengthened winding step WL, and in that at least the second variant is formed by coil elements according to the description.

An aspect of the invention accordingly comprises a wave winding which is a distributed winding in which the coils of the winding are distributed, respectively, over the circumference of the electric machine. The electric machine has at least one phase, although a plurality of phases, particularly three phases, can also be provided. A fixed quantity of magnetic poles is provided, these magnetic poles being distributed over a circumference of the electric machine. This quantity corresponds to the number of poles and is an even number, since there is an equal quantity of magnetic North poles and South poles. Either the rotor, or the stator, or the rotor and the stator of the electric machine have slots for receiving the wave winding. A plurality of coil strands connected in parallel can also be provided for each phase. The electric machine preferably has a number of holes of at least three, which means that a quantity of slots adjacent in circumferential direction corresponding to the number of holes is provided for each pole. The coil strands have in each instance at both ends thereof a connection pin and are divided in each instance into a plurality of partial strands which are connected in series. Each partial strand has a plurality of conductor elements corresponding to the number of poles of the electric machine and accordingly stretches once around the circumference. Two adjacent conductor elements are connected to one another in each instance by a turn region to form a hairpin. The conductor elements are received in layers in the slots, and two layers adjacent in radial direction form a double layer in each instance, the conductor elements of a partial strand preferably being arranged in a double layer.

Each hairpin has contact regions at its free ends. The turn region is preferably formed integral with the conductor elements in each instance. In order to connect adjacent hairpins to one another, the contact region is constructed as a contact pin that is connected to a corresponding contact pin of an adjacent hairpin of the coil strand for an electrically conductive connection, for example, welding. The contact region can also be constructed as a connection pin formed to connect the coil strand, more precisely the two ends of a coil strand, to power electronics for controlling the electric machine. The contact pins and connection pins advantageously have the same geometrical form so that there is a smaller quantity of different parts, which reduces costs and assembly effort. Different geometries are also possible in order, for example, to facilitate connection to the power electronics.

Wave windings according to one aspect of the invention have two different variants of hairpins. For this purpose, in a first variant of the hairpins, the turn region has a shortened winding step WK between the conductor elements. The shortened winding step WK is shorter by one than a theoretical standard winding step WS that shows the distance between the slots of the conductor elements on the theoretical value of the product of the number of holes multiplied by the quantity of phases in which the same slot position, for example, right, center or left, is always occupied for each pole when a number of holes is three. A change between the slots is achieved by means of the shortened winding step WK. Because of the relationship WK=WS−1, where WK represents the shortened winding step and WS represents the standard winding step, a change of the conductor elements of a partial strand between adjacent slots of the consecutive poles connected via the turn region of the hairpin is carried out by the first variant of hairpins. Accordingly, depending on the viewing direction and a number of holes of three, a change from a right slot to a middle slot or from a middle slot to a left slot takes place.

Therefore, hairpins in a second variant are also provided. The hairpins of the second variant have a lengthened winding step WL which is greater than the shortened winding step WK by the value of the number of holes q. The lengthened winding step WL can also be represented by the formula WL=WK+q, where q represents the value of the number of holes, WL represents the lengthened winding step of the second variant of hairpins, and WK represents the shortened winding step of the first variant of hairpins. As a result of these hairpins with a lengthened winding step WL, a change occurs between the outer slot positions of consecutive conductor elements from the left slot to the right slot, where the designations "left" and "right" depend on the viewing direction.

Both of the variants have in common that the contact regions are deformed in each instance by one half of the standard winding step WS in direction opposite the turn region in order to achieve the standard winding step WS between interconnected conductor elements of adjacent hairpins. In other words, according to the invention, wave windings have a consistent winding step on the axial side of the contact regions for all of the layers so that the production and connection, for example, by welding, of the corresponding contact regions to one another is facilitated. The deformation is carried out for each layer alternately in opposite circumferential direction, since the conductor elements of each hairpin are arranged in different layers of a double layer.

Further embodiment forms of a wave winding are characterized in that the coil element has a plurality of turn regions W, both the turn regions W with shortened winding step WK and the turn regions W with lengthened winding step WL being provided. When wave conductors are used, the coil elements have a plurality of turn regions W at both axial ends of the coil body. Therefore, in order to achieve a desired winding scheme, turn regions W with at least partially different winding steps are provided for a wave conductor as coil element.

Further advantageous embodiment forms of a wave winding are characterized in that turn regions W with lengthened winding step WL and turn regions W with shortened winding step WK alternate along the coil element with a turn region having a standard winding step WS, and in that more turn regions W with shortened winding step WK are provided than turn regions W with lengthened winding step WL, preferably twice as many. To form a desired winding scheme, for example, analogous to the embodiment forms with hairpins described above, turn regions with a standard winding step WS are advantageously always provided to alternate with other winding steps so that they are located on one axial side of the coil body. Since more hairpins of the first variant are needed than hairpins of the second variant, correspondingly more turn regions with shortened winding step WK are provided than turn regions with lengthened winding step WL when wave conductors are used. Correspondingly, for a preferred number of holes of three, twice as many turn regions W with shortened winding step WK are provided than turn regions W with lengthened winding step WL.

Embodiment forms of a wave winding are characterized in that the turn region W of the hairpins with lengthened winding step WL protrudes axially farther over a coil body than the turn region W of the hairpins with a shortened winding step WK. The turn regions of the hairpins connect the conductor elements in the slots of the coil body at one axial end of the coil body. The turn regions of the hairpins with shortened winding step can be arranged adjacent one another and formed with a like, preferably small, height. The turn regions of the hairpins with a lengthened winding step protrude axially farther over the coil body and span the turn regions with a shortened winding step.

Wave windings according to aspects of the invention are characterized in that at least one hairpin with lengthened winding step WL and at least two hairpins with a shortened winding step WK are provided for each partial strand. For reasons of advantageous symmetry, each partial strand on the average has a distance between the conductor elements, which corresponds to the standard winding step. For this purpose, a quantity of hairpins with shortened winding step corresponding to the number of holes minus one is provided for each hairpin with a lengthened winding step. Accordingly, the quantity of hairpins preferably satisfies the relationship of equation $n=m*(q-1)$, where n is the quantity of hairpins of a first variant with shortened winding step, m is the quantity of hairpins of a second variant with lengthened winding step, and q represents the number of holes.

Embodiment forms of a wave winding are characterized in that, for each partial strand, additionally at least one hairpin of a third variant is provided which has a turn region W with a standard winding step WS. In this way, depending on construction, longer partial strands can also be provided in which the average winding step corresponds to the standard winding step.

Embodiment forms of a wave winding are characterized in that, for each partial strand, the conductor elements run through each of the slots associated with the number of holes the same number of times. In this way, a high degree of symmetry is achieved for the coil strands, which is advantageous, inter alia, with respect to reduced losses.

In the event that hairpins of a third variant are provided, they are provided in a quantity corresponding to the number of holes or a multiple thereof and are preferably arranged in each instance between the hairpins of the first variant and the hairpins of the second variant.

Wave windings according to embodiment forms are characterized in that an integral multiple of parallel-connected coil strands are provided. Coils advantageously have a plurality of parallel strands. For each phase, the same number of parallel strands are preferably provided in each instance, for which reason there is provided an integral multiple of the number of phases on parallel strands.

Embodiment forms of a wave winding are characterized in that the connection pins of the parallel coil strands are arranged in the same pole in each instance. As a result of the arrangement in the same pole, the expenditure for an interconnection of the coil strands can be simplified and carried out smaller. Accordingly, installation space can be saved.

Wave windings according to embodiment forms are characterized in that the two connection pins of a coil strand are arranged in the same layer. It is also possible to economize on installation space when the two connection pins of a coil strand are arranged in a same, preferably outer, layer because, in this way, the interconnection can be made smaller or can be arranged from only one side, or the connection pins can simply be deformable in radial direction.

Alternative embodiment forms of wave windings are characterized in that the two connection pins of a coil strand are arranged in directly adjacent layers of a double layer. Apart from the deformability in radial direction, these embodiment forms have the same advantages as those mentioned above with an arrangement in one layer.

Further alternative embodiment forms of a wave winding are characterized in that one of the two connection pins of a coil strand is arranged, respectively, in the radially inner layer and in the radially outer layer. As a result of an arrangement of this kind, the connection pins are also easily accessible and it is possibly sufficient that the coil strands only run through the coil body in radial direction once.

Embodiment forms of wave windings are characterized in that a portion of each coil strand which comprises at least one partial strand is wound in opposite circumferential direction, in that the change of direction of the winding takes place between the partial strands in an outer layer in radial direction, in that the connection between the portions of the coil strand with different direction of winding is formed by a bridge element or a contact region K which is deformed in radial direction and opposite circumferential direction, which are electrically conductively connected to the contact regions K of the hairpins.

Because of the reversal of the direction of winding, losses are further reduced, since a greater symmetry of the wave winding is achieved.

Through the use of bridge elements, the uniform deformation of the contact regions of the hairpins can be maintained, which facilitates production and an electrically conducting connection between the corresponding partial strands can be achieved at the same time. As a result of the bridge element, a connection can easily be produced via a required circumferential region. A further advantage consists in that, depending on the available installation space for the electric machine, the bridge element is arranged either with an axial orientation or particularly preferably with a radial orientation.

Alternatively, instead of a bridge element, one of the corresponding contact regions can also be deformed radially outward and in opposite circumferential direction in order to achieve a direct connection between the contact regions. In this way, the process of deforming the contact regions, while somewhat more complicated, does away with the need for the bridge elements and positioning thereof.

Further subject matter of one aspect of the invention relates to a stator or a rotor for an electric machine which is characterized in that the stator is provided with a wave winding according to the above description and an electric machine in which a wave winding according to the preceding description is provided.

The features of the embodiment forms can be combined in any way.

BRIEF DESCRIPTION OF THE DRAWINGS

The invention will be explained in more detail in the following referring to drawings. Like or similar elements are designated with consistent reference numerals. In particular, the drawings show.

DETAILED DESCRIPTION OF THE PRESENTLY PREFERRED EMBODIMENTS

Figure 1A:
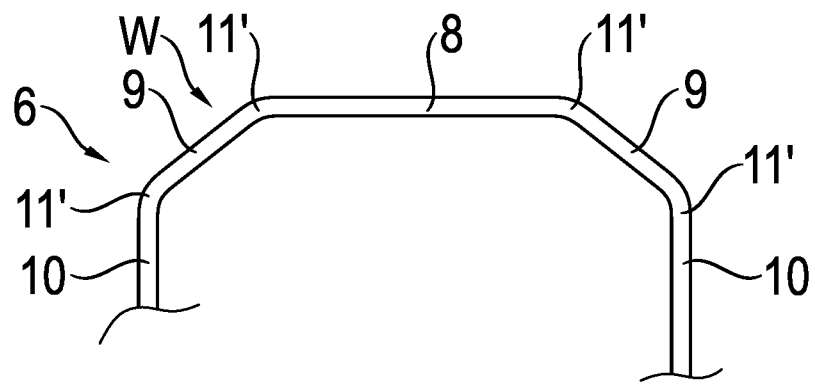
FIGS. 1A & 1B are a portion of a coil element viewed in radial direction.
Figure 1B:
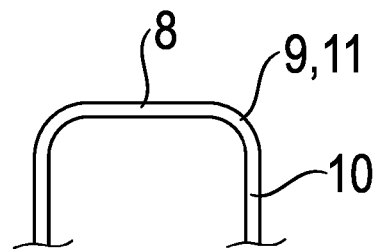

FIG. 1a and FIG. 1b each show an example of a coil element 6 in which only one turn region W with adjoining conductor elements 10 is shown. When the coil element 6 is configured as a hairpin, contact regions K, not shown, adjoin the conductor elements 10. When the coil element 6 is configured as a wave conductor, a further turn region W or a connection pin 5 adjoins the conductor elements 10 in each instance in a corresponding manner.

FIG. 1a and FIG. 1b both show two conductor elements 10, which extend parallel and which are connected via a turn region W. The turn region W comprises in each instance a transition 9 adjoining the conductor elements 10 and a connection portion 8 arranged between the transitions 9. A bending position 11; 11' is provided in each instance in the transition 9. The connection portion 8 extends in a straight line in the depicted plane which is also defined by the conductor elements 10 extending parallel.

In the embodiment example shown in FIG. 1a, the transitions 9 have in each instance two partial bending positions 11' which together form the bending position 11 and a straight portion extending therebetween.

In FIG. 1b, on the other hand, the transition 9 is formed by a continuously extending bending position 11.

Figure 2A:
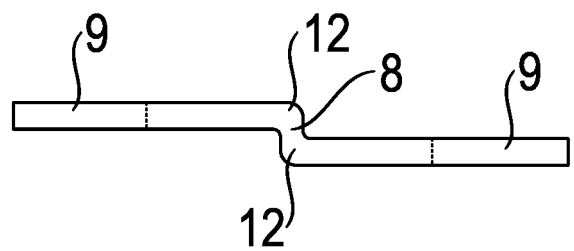
FIGS. 2A & 2B are a portion of a coil element viewed in axial direction.
Figure 2B:
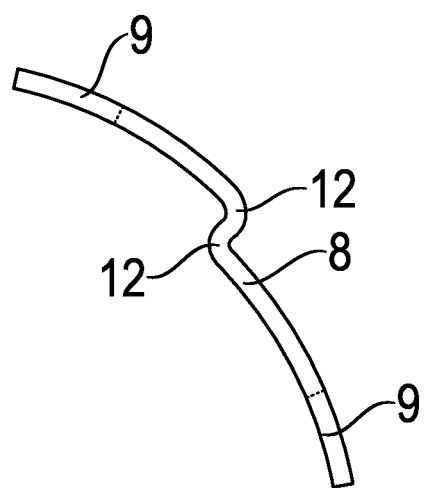

FIG. 2a and FIG. 2b each show an embodiment example of a coil element 6 viewed from an axial direction so that the depicted plane extends perpendicular to the conductor elements 10.

FIG. 2a and FIG. 2b also show basically the same construction in which only the turn region W is also shown. A transition 9 adjoins the connection portion 8 at both ends. Two further bending positions 12 which are bent in opposite directions are provided in the connection portion 8. Because of the further bending positions 12, an offset is achieved in the connection portion 8 by which, for example, the change of conductor elements 10 between different layers of the slots 3 is facilitated. The further bending positions 12 divide the connection portion into two regions extending parallel. Configurations are also possible in which the further bending positions 12 do not directly follow one another but are divided from one another by a further region of the connection portion 8 so that a larger offset can be achieved.

In FIG. 2a, the transitions 9 and the connection portion 8 extend in a straight line in the depicted plane, except for the further bending positions 12.

In contrast to FIG. 2a, a common curvature is superimposed on the transitions 9 and the connection portion 8 in order to adapt the configuration of the latter to the diameter of a coil body 2. Alternatively, a curvature of this kind can also be provided only at the transitions 9 or connection portion 8.

FIGS. 1a, 1b, 2a, and 2b are shown with asymmetrical construction in each instance. However, embodiment forms are also possible which are not symmetrical and, for example, the transitions 9 are not identically formed or the further bending positions 12 are not provided in the center of the connection portion 8.

Figure 3:
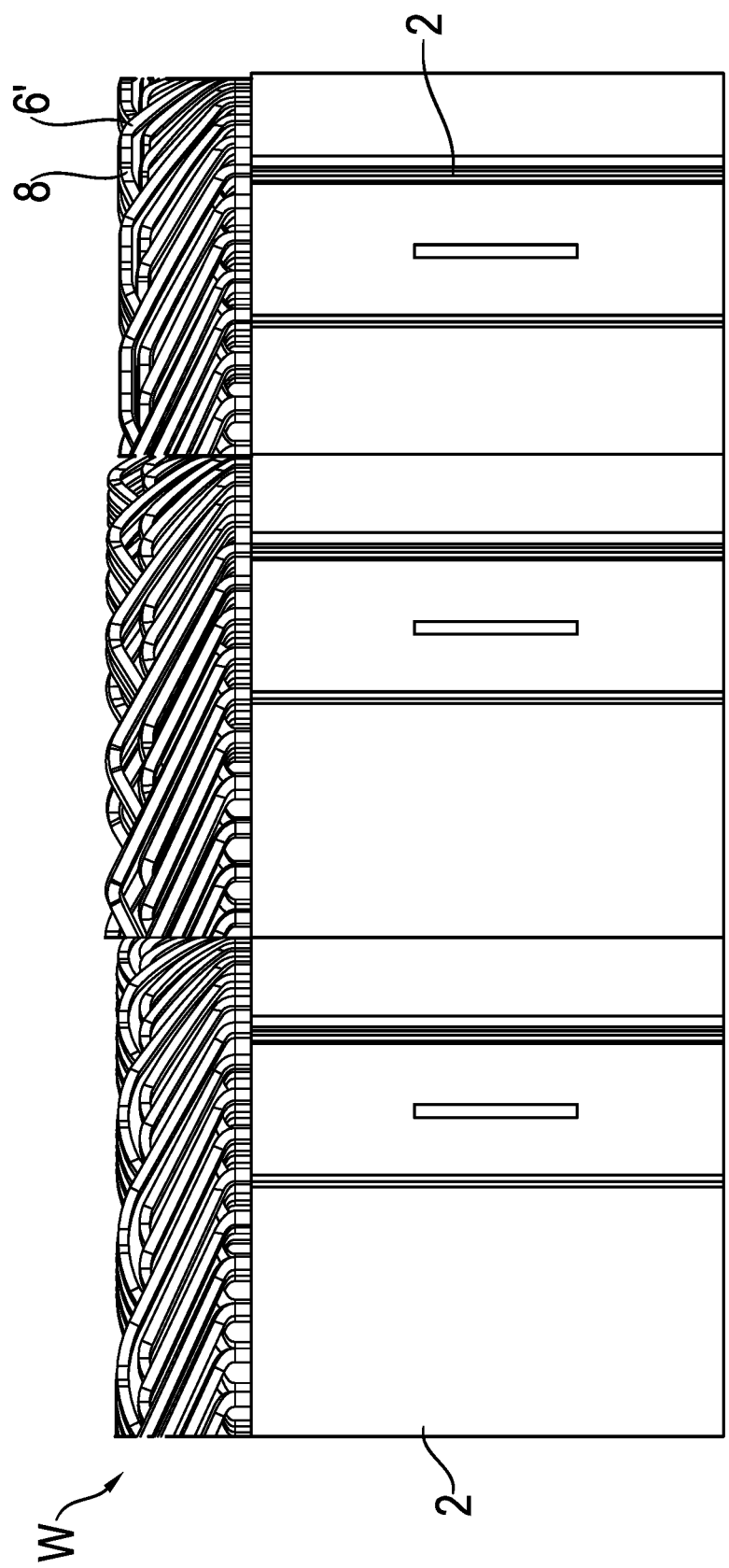
FIG. 3 is a comparison of different turn regions side by side.

FIG. 3 shows three coil bodies 2 with wave windings side by side as comparison examples. The wave windings have a similar winding scheme. The difference consists in that the coil elements 6' that protrude axially farther over the coil body 2 are constructed differently. As will clearly be seen, the comparison example on the right with coil elements according to a configuration according to one aspect of the invention needs less installation space in axial direction. Accordingly, the coil can be formed more compactly in axial direction or needs less space.

Figure 4:
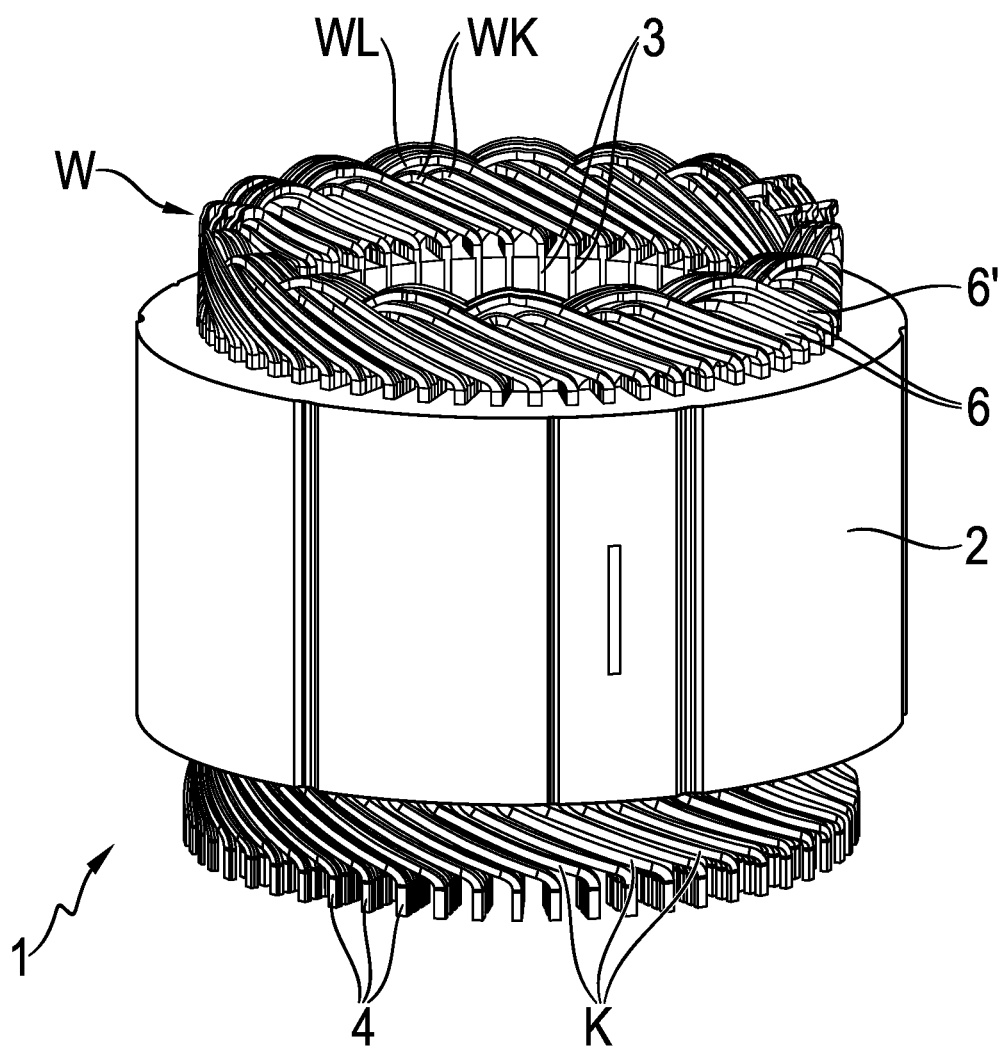
FIG. 4 is a coil with a wave winding in a perspective view.

FIG. 4 shows a coil body with a wave winding 1 according to the comparison example on the left in FIG. 3, in this case as a stator. As is also shown in FIG. 3, a wave winding described in the following can also be formed with coil elements 6, 6' according to one aspect of the invention. The stator has a coil body 2 in which slots 3 are formed for receiving the wave winding. Conductor elements 10 in the depicted example in the context of hairpins 6, 6' are inserted into the slots 3, a plurality of conductor elements 10 being inserted in layers for each slot 3.

The hairpins 6, 6' in the depicted example comprise in each instance two conductor elements 10, a turn region W in which the conductor elements 10 are integrally connected to one another, and contact regions K at the ends of the hairpins 6, 6'. With the exception of the first and last hairpins 6, 6', respectively, of the individual coil strands, the hairpins 6, 6' are formed in their contact regions K with two contact pins 4 which are electrically conductively connected in each instance to the adjacent hairpin 6, 6' in the coil strand or, more precisely, the corresponding contact pin 4 thereof. The first and last hairpin 6, 6', respectively, of a coil strand has a contact pin 4 for connecting to the adjacent hairpin 6, 6' of the coil strand and a connection pin 5 for connecting to power electronics, not shown.

To enable mutual contacting, all of the contact pins 4 of the wave winding are arranged on the same axial side of the coil body 2 so that the turn regions W of the hairpins 6, 6' are correspondingly arranged on the opposite axial side of the coil body 1.

On the side of the turn regions W, a uniform pattern forms with parallelly running turn regions W with a shortened winding step WK which are bridged in each instance by a turn region W with lengthened winding step WL. A quantity of hairpins 6 of the first variant with shortened winding step WK which corresponds to the number of holes q minus one and a hairpin 6' of the second variant with lengthened winding step WL are provided adjacent for each pole.

Accordingly, in the depicted embodiment example with a number of holes of three, two hairpins 6 of the first variant and one hairpin 6' of the second variant. By the hairpins 6 of the first variant, a change always takes place from the right slot 3 to a middle slot 3 or from a middle slot 3 to a left slot 3 of the adjacent layer. With the hairpin 6' of the second variant, there is always a change between a left slot 3 and a right slot 3 of the adjacent layer.

Figure 5:
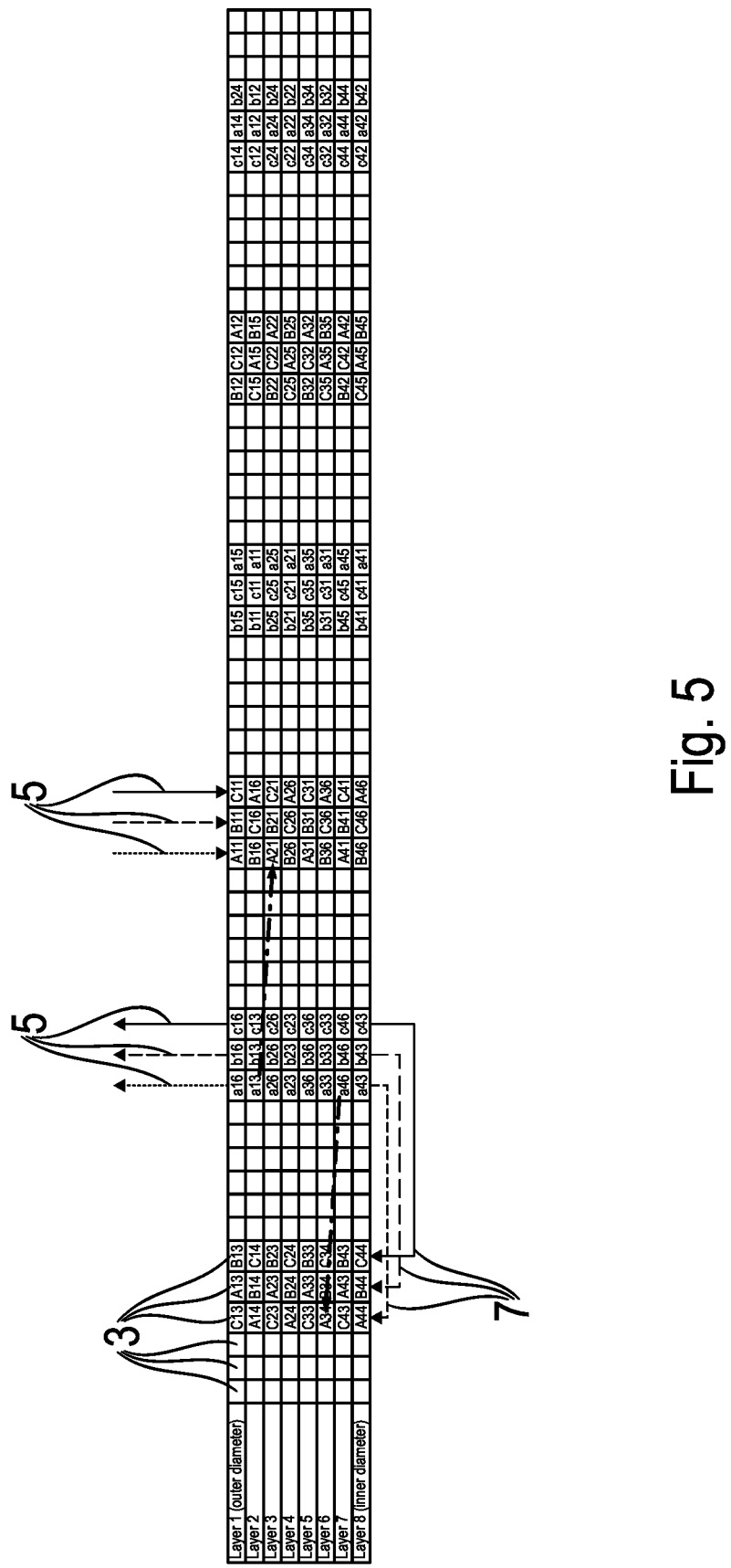
FIG. 5 is an example of a winding scheme for a coil strand.

FIG. 5 shows a winding scheme for a first coil strand analogous to an example shown in FIG. 4 with a number of holes of three, wherein an embodiment example with 54 slots 3 is shown.

A developed view of the slots 3 is shown with layers, eight layers in this case, and therefore four double layers per slot 3. However, a different quantity of slots 3 or layers, for example, the six layers in FIG. 4, is also possible.

Shown in the layers are only the conductor elements of the hairpins 6, 6' for parallel partial strands of a pole in the three respective slots 3 per pole. The conductor elements are numbered in such a manner that the number comprises an alphabetic character for the partial strand and a two-digit number. The two conductor elements of the respective hairpin 6, 6' are distinguished by uppercase and lowercase alphabetic characters, respectively. The first digit of the two-digit number indicates the double layer in which the hairpin 6, 6' is arranged, and the second digit stands for a consecutive numbering of the hairpins 6, 6' in the direction of current flow in this double layer. The conductor elements adjacent the connection pins 5 or, in other words, the corresponding first conductor element and last conductor element of the coil strands, are designated by arrows which are shown in solid lines, dashed lines and dotted lines to distinguish the different strands.

The connection pins 5 of the individual coil strands are provided in the depicted example in the radially outer layer of the wave winding, and the connection pins 5 of the parallel coil strands are arranged in the same pole, respectively. Because of the arrangement in the radially outer layer, a connection can be made to the power electronics in radial direction so that only minimal installation space, if any, is needed in axial direction. Because of the arrangement in the same pole, the connection pins 5 for the cathode and the anode are arranged directly adjacent. The connection pins 5 of the parallel coil strands for the cathode and the anode are arranged offset in circumferential direction by a pole of the coil strand. Because of this configuration, only a small area of the circumference is required for the connection to the power electronics.

Through the turn regions W, a change is carried out in the depicted example from a left slot 3 to a right slot 3 distributed over the circumference in that a hairpin 6' of the second variant with a lengthened winding step WL is provided. In the depicted embodiment example, two hairpins 6 of the first variant with shortened winding step WK are provided in the rest of the partial strand of the respective coil strand to change from a right slot 3 to a middle slot 3 or from a middle slot 3 to a left slot 3. In the depicted example, only hairpins 6, 6' of the first and second variants are provided. In this way, a higher degree of symmetry is achieved, which reduces losses. Depending on the quantity of poles and the like, a different distribution of the hairpins 6, 6' of different variants along the circumference is also possible. Hairpins of a third variant with a standard winding step WS can also be provided.

As is shown in FIG. 5, the coil strands first run through the radially outer double layer with the first partial strand in each instance. The first partial strand passes into the second partial strand through a corresponding connection of the contact pins 4, this second partial strand running through the next double layer in the same direction of winding analogous to the first partial strand. This passage between the double layers is indicated by way of example in FIG. 5 by an arrow with a dash-dot line. In this manner, initially the slots 3 of the double layers are traversed with a same direction of winding from radially outward to radially inward.

At the last contact pin 4 of the partial strand, in this case the fourth partial strand in the radially inner layer, the electrically conducting connection to the first contact pin 4 of the partial strand, in this case the fifth partial strand, is produced in each instance by a bridge element 7.

In this connection via the bridge element, a reversal of direction of the winding takes place. In the depicted example, a winding step corresponding to the standard winding step WS is carried out by means of the bridge element 7.

Alternatively, bridge elements 7 with different winding steps corresponding, for example, to the lengthened winding step or shortened winding step are also possible in order to change between the slots 3 during the transition between the partial strands.

Also, as an alternative to a separate bridge element 7, it is possible that the corresponding last contact pin 4 or first contact pin 4 is deformed in radial direction into an imaginary further layer, and this is deformed in a circumferential direction opposite to the original layer in order to connect directly to the corresponding contact pin 4 in the manner of the further contact pins 4, for example, by welding.

The partial strand, in this case the fifth partial strand, which runs through the slots in the radially inner double layer in opposite direction subsequently passes into the sixth partial strand which likewise passes through the slots 3 in the adjacent double layer. This passage is likewise indicated by way of example by an arrow with dash-dot line. The partial strands running back to the radially outer layer have a configuration analogous to the above-mentioned partial strands. The last hairpin of the partial strand, in this case the eighth partial strand, correspondingly has at the end thereof, which also represents the end of the coil strand, the contact pin 5 for connecting to the power electronics.

Embodiment forms in which connection pins 5 are provided at the radially inner layer or embodiment forms in which connection pins 5 are provided both at the radially outer layer and radially inner layer are also possible.

The invention is not limited to this configuration. As was mentioned above, individual advantageous features only may also be provided.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A coil element for a coil of an electric machine comprising:
   at least two conductor elements extending in parallel arranged in slots of a coil body;
   one connection portion configured to connect two respective conductor elements to one another,
   wherein the at least two conductor elements and the one connection portion are integrally formed; and
   a bending position arranged in a first plane and defined by the two conductor elements and is provided only at a transition from a respective conductor element to the one connection portion, wherein the one connection portion extends in a straight line, wherein a plurality of phases and a number of holes q of at least three are provided, in that the wave winding has a standard winding step WS of WS=q×m, where q corresponds to the number of holes and m corresponds to the quantity of phases, in that at least a quantity of coil strands corresponding to the number of holes q is provided connected in parallel, wherein the coil strands comprise at least one coil element with at least one turn region W, wherein the turn region W comprises the one connection portion and adjacent transitions, wherein two different variants of coil elements are provided, in a first variant of the coil elements, the turn region W has a shortened winding step WK between the conductor elements, and in a second variant of the coil elements, the turn region W has a lengthened winding step WL.

2. The coil element according to claim 1, wherein the bending position in the transition is divided into two partial bending positions connected by a straight intermediate portion.

3. A coil element for a coil of an electric machine comprising:
   at least two conductor elements extending in parallel arranged in slots of a coil body;
   one connection portion configured to connect two respective conductor elements to one another,
   wherein the at least two conductor elements and the one connection portion are integrally formed; and
   a bending position arranged in a first plane and defined by the two conductor elements and is provided only at a transition from a respective conductor element to the one connection portion,
   wherein two further bending positions in a second plane extending perpendicular to the first plane defined by the conductor elements are comprised at the one connection portion, and the further bending positions are bent in opposite directions,
   wherein a plurality of phases and a number of holes q of at least three are provided, in that the wave winding has a standard winding step WS of WS=q×m, where q corresponds to the number of holes and m corresponds to the quantity of phases, in that at least a quantity of coil strands corresponding to the number of holes q is provided connected in parallel, wherein the coil strands comprise at least one coil element with at least one turn region W, wherein the turn region W comprises the one connection portion and adjacent transitions, wherein two different variants of coil elements are provided, in a first variant of the coil elements, the turn region W has a shortened winding step WK between the conductor elements, and in a second variant of the coil elements, the turn region W has a lengthened winding step WL.

4. The coil element according to claim 3, wherein the two further bending positions divide the one connection portion into a plurality of regions, and two of the regions extend in parallel.

5. The coil element according to claim 1, wherein the one connection portion or at least a region of the connection portion bounded by bending positions extends arcuately in a plane extending perpendicular to the conductor elements.

6. The coil element according to claim 1, wherein the one connection portion lies in a plane extending perpendicular to the conductor elements.

7. A wave winding for an electric machine with at least one coil element comprising:
   at least two conductor elements extending in parallel arranged in slots of a coil body;
   one connection portion configured to connect two respective conductor elements to one another,
   wherein the at least two conductor elements and the one connection portion are integrally formed;
   a bending position arranged in a first plane and defined by the two conductor elements and is provided only at a transition from a respective conductor element to the one connection portion, wherein the one connection portion extends in a straight line,
   wherein a plurality of phases and a number of holes q of at least three are provided, in that the wave winding has a standard winding step WS of WS=q×m, where q corresponds to the number of holes and m corresponds to the quantity of phases, in that at least a quantity of coil strands corresponding to the number of holes q is provided connected in parallel, wherein the coil strands comprise at least one coil element with at least one turn region W, wherein the turn region W comprises the one connection portion and adjacent transitions, wherein two different variants of coil elements are provided, in a first variant of the coil elements, the turn region W has a shortened winding step WK between the conductor elements, and in a second variant of the coil elements, the turn region W has a lengthened winding step WL.

8. The wave winding according to claim 7, wherein at least two different coil elements are provided that protrude to different extents over the coil body in axial direction with their connection portions, and at least the coil elements protruding farther over the coil body are at least partially formed as the coil elements.

9. The wave winding according to claim 8, wherein the coil element has a plurality of turn regions W, wherein both turn regions W with shortened winding step WK and turn regions W with lengthened winding step WL are provided.

10. The wave winding according to claim 9, wherein turn regions W with lengthened winding step WL and turn regions W with shortened winding step WK alternate along the coil element with a turn region having a standard winding step WS, and in that, preferably twice as many, turn regions W with shortened winding step WK are provided than turn regions W with lengthened winding step WL.

11. A stator for an electric machine, wherein the stator is provided with a wave winding comprising:
   at least two conductor elements extending in parallel arranged in slots of a coil body;
   one connection portion configured to connect two respective conductor elements to one another,
   wherein the at least two conductor elements and the one connection portion are integrally formed; and
   a bending position arranged in a first plane and defined by the two conductor elements and is provided only at a transition from a respective conductor element to the one connection portion, wherein the one connection portion extends in a straight line,
wherein a plurality of phases and a number of holes q of at least three are provided, in that the wave winding has a standard winding step WS of WS=q×m, where q corresponds to the number of holes and m corresponds to the quantity of phases, in that at least a quantity of coil strands corresponding to the number of holes q is provided connected in parallel, wherein the coil strands comprise at least one coil element with at least one turn region W, wherein the turn region W comprises the one connection portion and adjacent transitions, wherein two different variants of coil elements are provided, in a first variant of the coil elements, the turn region W has a shortened winding step WK between the conductor elements, and in a second variant of the coil elements, the turn region W has a lengthened winding step WL.

12. A rotor for an electric machine, wherein the rotor is provided with a wave winding comprising:
at least two conductor elements extending in parallel arranged in slots of a coil body;
one connection portion configured to connect two respective conductor elements to one another,
wherein the at least two conductor elements and the one connection portion are integrally formed; and
a bending position arranged in a first plane and defined by the two conductor elements and is provided only at a transition from a respective conductor element to the one connection portion, wherein the one connection portion extends in a straight line,
wherein a plurality of phases and a number of holes q of at least three are provided, in that the wave winding has a standard winding step WS of WS=q×m, where q corresponds to the number of holes and m corresponds to the quantity of phases, in that at least a quantity of coil strands corresponding to the number of holes q is provided connected in parallel, wherein the coil strands comprise at least one coil element with at least one turn region W, wherein the turn region W comprises the one connection portion and adjacent transitions, wherein two different variants of coil elements are provided, in a first variant of the coil elements, the turn region W has a shortened winding step WK between the conductor elements, and in a second variant of the coil elements, the turn region W has a lengthened winding step WL.

13. An electric machine, wherein at least one wave winding comprising:
at least two conductor elements extending in parallel arranged in slots of a coil body;
one connection portion configured to connect two respective conductor elements to one another,
wherein the at least two conductor elements and the one connection portion are integrally formed; and
a bending position arranged in a first plane and defined by the two conductor elements and is provided only at a transition from a respective conductor element to the one connection portion, wherein the one connection portion extends in a straight line,
wherein a plurality of phases and a number of holes q of at least three are provided, in that the wave winding has a standard winding step WS of WS=q×m, where q corresponds to the number of holes and m corresponds to the quantity of phases, in that at least a quantity of coil strands corresponding to the number of holes q is provided connected in parallel, wherein the coil strands comprise at least one coil element with at least one turn region W, wherein the turn region W comprises the one connection portion and adjacent transitions, wherein two different variants of coil elements are provided, in a first variant of the coil elements, the turn region W has a shortened winding step WK between the conductor elements, and in a second variant of the coil elements, the turn region W has a lengthened winding step WL.

* * * * *